United States Patent
Boettcher et al.

[11] Patent Number: 5,432,277
[45] Date of Patent: Jul. 11, 1995

[54] METAL-FREE PHTHALOCYANINE OF THE GAMMA-FORM

[75] Inventors: Peter Boettcher, Mutterstadt; Peter Erk, Frankenthal; Joachim Jesse, Weisenheim, all of Germany

[73] Assignee: BASF Aktiengesellschaft, Ludwigshafen, Germany

[21] Appl. No.: 136,287

[22] Filed: Oct. 15, 1993

[30] Foreign Application Priority Data

Oct. 16, 1992 [DE] Germany ............... 42 34 922.2

[51] Int. Cl.⁶ .............................. C09B 47/30
[52] U.S. Cl. ........................................ 540/122
[58] Field of Search ............................ 540/122

[56] References Cited

U.S. PATENT DOCUMENTS 3,357,989 12/1967 Byrne et al. ............... 260/314.5
4,814,441 3/1989 Hauser et al. .................. 540/122
5,296,034 3/1994 Dietz et al. ..................... 106/412

FOREIGN PATENT DOCUMENTS 0093331 11/1983 European Pat. Off. .
2218788 12/1972 Germany .
2516054 10/1976 Germany .
1230581 11/1988 Japan .

OTHER PUBLICATIONS

Moser et al. The Phthalocyanines: Properties, vol. 1, Chapter 4, pp. 21–24, 1983.
Chemistry Letters, 1984, The Chemical Society of Japan, pp. 2037–2040, S. Takano, et al., "A New Polymorph of Metal-Free Phthalocyanine".

Primary Examiner—Mukund J. Shah
Assistant Examiner—Pavanaram K. Sripada
Attorney, Agent, or Firm—Oblon, Spivak, McClelland, Maier, & Neustadt

[57] ABSTRACT

Metal-free phthalocyanine of the γ-form is suitable inter alia for coloring printing inks, plastics and coatings and is characterized by the X-ray powder diagram (Cu$K_\alpha$) having the essential glancing angles 2 theta [°]6.8, 7.4, 13.6, 14.9, 15.9, 16.9, 20.5, 22.4, 24.7, 26.2 and 27.8, possibly in mixture with other crystal forms, in which case the glancing angles may be shifted by ±0.2° (FIG. 1).

4 Claims, 3 Drawing Sheets

2-Theta - Scale

2-Theta - Scale

2-Theta - Scale

METAL-FREE PHTHALOCYANINE OF THE GAMMA-FORM

FIELD OF THE INVENTION

The present invention relates to metal-free phthalocyanine of the γ-form, characterized by the X-ray powder diagram (Cu$_{K\alpha}$) having the essential glancing angles 2 theta [°] 6.8, 7.4, 13.6, 14.9, 15.9, 16.9, 20.5, 22.4, 24.7, 26.2 and 27.8 (FIG. 1), possibly in mixture with other crystal forms, in which case the glancing angles may be shifted by ±0.2°.

Metal-free phthalocyanine has various crystal forms (F. H. Moser, A. L. Thomas, The Phthalocyanines, CRC Press Inc., 1983). The literature describes the forms α, β and x (U.S. Pat. No. 3 357 989; DE-A-22 18 788; F. H. Moser, A. L. Thomas, The Phthalocyanines, CRC Press Inc., 1983) and τ (EP-A-93 331; S. Takano, T. Enokida, A. Kakuta and Y. Mori, Chemistry Lett. 1984, 2037-40). Hitherto the γ form, which is known for copper phthalocyanine, has not been described for the metal-free phthalocyanine. The reports in the literature (F. H. Moser, A. L. Thomas, The Phthalocyanines, CRC Press Inc., 1983, Volume I, p. 23) of a γ-form could not be verified; on the contrary, it was reported that it must have been the α-form (F. H. Moser, A. L. Thomas, The Phthalocyanines, CRC Press Inc., 1983, Volume I, p. 23; EP-A-93 331).

SUMMARY OF THE INVENTION

It is an object of the present invention to provide further phthalocyanine pigments that are free of heavy metals and have interesting coloristic properties.

We have found that this object is achieved by metal-free phthalocyanine of the γ-form, characterized by an X-ray powder diagram (Cu$_{K\alpha}$) having the essential glancing angles 2 theta [°] 6.8, 7.4, 13.6, 14.9, 15.9, 16.9, 20.5, 22.4, 24.7, 26.2 and 27.8 (FIG. 1), possibly in mixture with other crystal forms, in which case the glancing angles may be shifted by ±0.2°.

The glancing angles were measured by the method of Debye-Scherrer using a D 5000 X-ray diffractometer from Siemens. The coloristically most useful pigments are those where the γ-form is present in mixture with other forms. Reddish pigments contain from 35 to 100%, preferably 40-80% of the γ-form, while green variants have a γ-content of from 10 to 30%.

To prepare the novel pure γ-form, metal-free phthalocyanine of any form can be dissolved in sulfuric acid monohydrate and precipitated by pouring into dimethylformamide.

Reddish pigments are obtained for example by introducing metal-free phthalocyanine having a β-content of <25%, preferably <10%, into 40-75, preferably 55-70, strength by weight sulfuric acid at from 10° to 40° C., preferably from 20° to 30° C. Following a treatment time of about 2-50 hours, in general 15-30 hours, and subsequent pouring of the sulfuric acid-pigment paste into water, the conversion into a mixture of the invention is complete.

Greenish pigments are obtained in the same way starting from metal-free phthalocyanine having a β-content of a ≧25%.

The pigments of the invention have coloristic properties approaching those of phthalocyanines that contain heavy metals. Without further finishing they are highly suitable for use as colorants in printing inks and plastics, in toners and in components for electrophotography and also, with or without the addition of crystal form stabilizers, in coatings.

DESCRIPTION OF THE PREFERRED EMBODIMENTS

EXAMPLES

General

The metal-free phthalocyanine used in Examples 3-26 was in each case comminuted in a ball mill before the treatment with sulfuric acid.

The following examples describe the preparation of the pure γ-form of the pigment:

EXAMPLE 1

120 g of metal-free phthalocyanine were introduced at <10° C. into 1200 g of sulfuric acid monohydrate and stirred therein until completely dissolved. The solution was then poured at <5° C. into 5 liters of dimethylformamide (DMF) and the mixture was stirred at room temperature for 12 hours. The precipitate was then filtered off, washed with methanol and water and dried at 65° C. under reduced pressure.

EXAMPLE 2

Example 1 was repeated with stirring for 48 hours.

Pigments as claimed in claim 4 were prepared as follows:

EXAMPLE 3

To 4500 g of 61.5% strength by weight sulfuric acid were added over 10 minutes at 20° C. 450 g of metal-free phthalocyanine having a β-form content of 42%. The mixture was heated to 25° C., stirred at that temperature for 16 h, then poured into 10 l of water at 80° C. and stirred for a further hour. The precipitated pigment was filtered off, washed neutral with water and dried at 80° C. under reduced pressure.

EXAMPLE 4

Example 3 was repeated with metal-free phthalocyanine having a β-form content of 48%.

EXAMPLE 5

Example 3 was repeated with metal-free phthalocyanine having a β-form content of 66%.

EXAMPLE 6

Example 3 was repeated with metal-free phthalocyanine having a β-form content of 30%.

EXAMPLE 7

Example 3 was repeated with metal-free phthalocyanine having a β-form content of 75%.

EXAMPLE 8

Example 3 was repeated with a sulfuric acid residence time of 24 hours.

EXAMPLE 9

Example 3 was repeated with 62.5% strength by weight sulfuric acid and a sulfuric acid residence time for the metal-free phthalocyanine of 24 hours.

EXAMPLE 10

Example 3 was repeated with 63.5% strength by weight sulfuric acid and a sulfuric acid residence time for the metal-free phthalocyanine of 24 hours.

EXAMPLE 11

Example 3 was repeated with 65% strength by weight sulfuric acid and a sulfuric acid residence time for the metal-free phthalocyanine of 24 hours.

EXAMPLE 12

Example 3 was repeated with 66% strength by weight sulfuric acid and a sulfuric acid residence time for the metal-free phthalocyanine of 16 hours.

Figure 3:
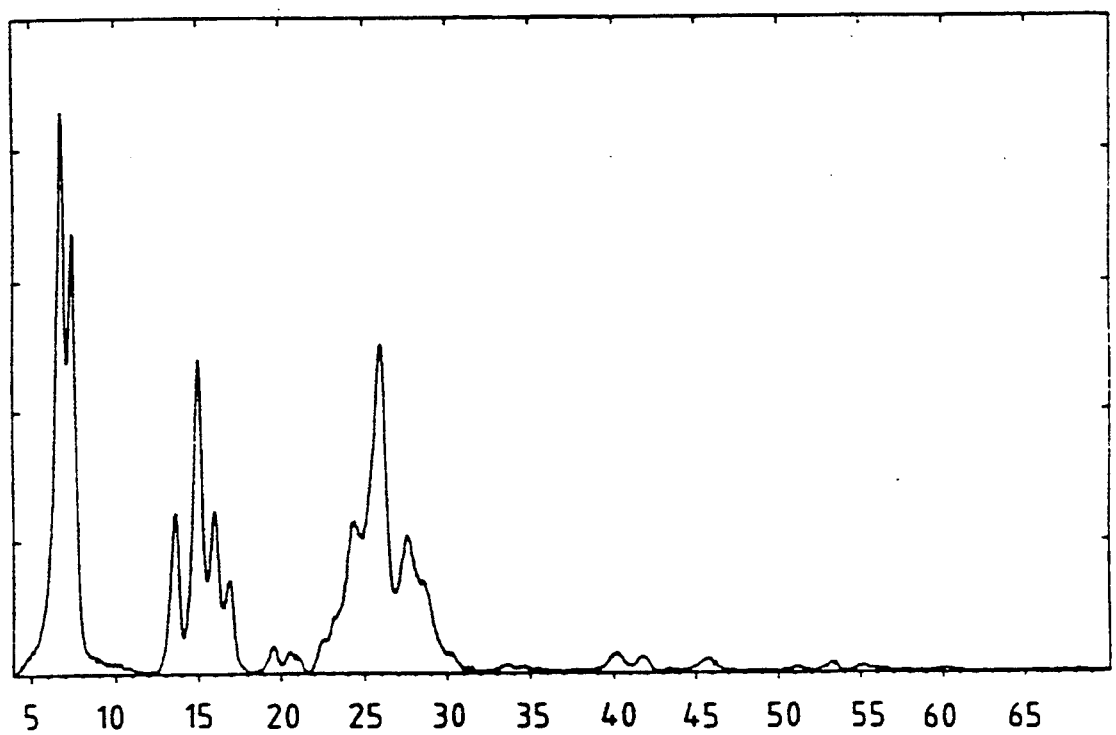

Examples 3 to 12 produced products having the X-ray diffractogram of FIG. 3 and a greenish hue.

EXAMPLE 13

Example 3 was repeated with 64% strength by weight sulfuric acid and a sulfuric acid residence time for the metal-free phthalocyanine of 24 hours. In addition, 10% by weight of the additives mentioned in DE-C-25 16 054 were added to the product.

EXAMPLE 14

Example 3 was repeated with 68% strength by weight sulfuric acid and a sulfuric acid residence time for the metal-free phthalocyanine of 16 hours. In addition, 10% by weight of the additives mentioned in DE-C-25 16 054 were added to the product.

The products of Examples 13 and 14 were suitable for coatings.

Pigments as claimed in claim 3 were prepared as follows:

EXAMPLE 15

To 445 g of 60.5% strength by weight sulfuric acid were added at 20° C. 45 g of metal-free phthalocyanine having a β-content of 8%. After stirring at 25° C. for 40 hours the mixture was poured into 1 liter of water at 80° C. and stirred for a further hour. The precipitated pigment was filtered off, washed neutral with water and dried at 80° C. under reduced pressure.

EXAMPLE 16

Example 15 was repeated with a sulfuric acid residence time for the metal-free phthalocyanine of hours.

EXAMPLE 17

Example 15 was repeated with metal-free phthalocyanine having a β-content of 0%.

EXAMPLE 18

Example 15 was repeated with 61.5% strength by weight sulfuric acid, metal-free phthalocyanine having a β-content of 0%, and a sulfuric acid residence time of hours.

EXAMPLE 19

Example 15 was repeated with 61.5% strength by weight sulfuric acid, metal-free phthalocyanine having a β-content of 0%, and a sulfuric acid residence time of hours.

EXAMPLE 20

Example 15 was repeated with 62.5% strength by weight sulfuric acid, metal-free phthalocyanine having a β-content of 0%, and a sulfuric acid residence time of 16 hours.

EXAMPLE 21

Example 15 was repeated with 63.5% strength by weight sulfuric acid, metal-free phthalocyanine having a β-content of 0%, and a sulfuric acid residence time of 24 hours.

EXAMPLE 22

Example 15 was repeated with 64% strength by weight sulfuric acid, metal-free phthalocyanine having a β-content of 0%, and a sulfuric acid residence time of hours.

EXAMPLE 23

Example 15 was repeated with 65% strength by weight sulfuric acid, metal-free phthalocyanine having a β-content of 0%, and a sulfuric acid residence time of 24 hours.

EXAMPLE 24

Example 15 was repeated with 65% strength by weight sulfuric acid, metal-free phthalocyanine having a β-content of 0%, and a sulfuric acid residence time of 16 hours.

EXAMPLE 25

Example 15 was repeated with 66% strength by weight sulfuric acid, metal-free phthalocyanine having a β-content of 0%, and a sulfuric acid residence time of 24 hours.

Figure 2:
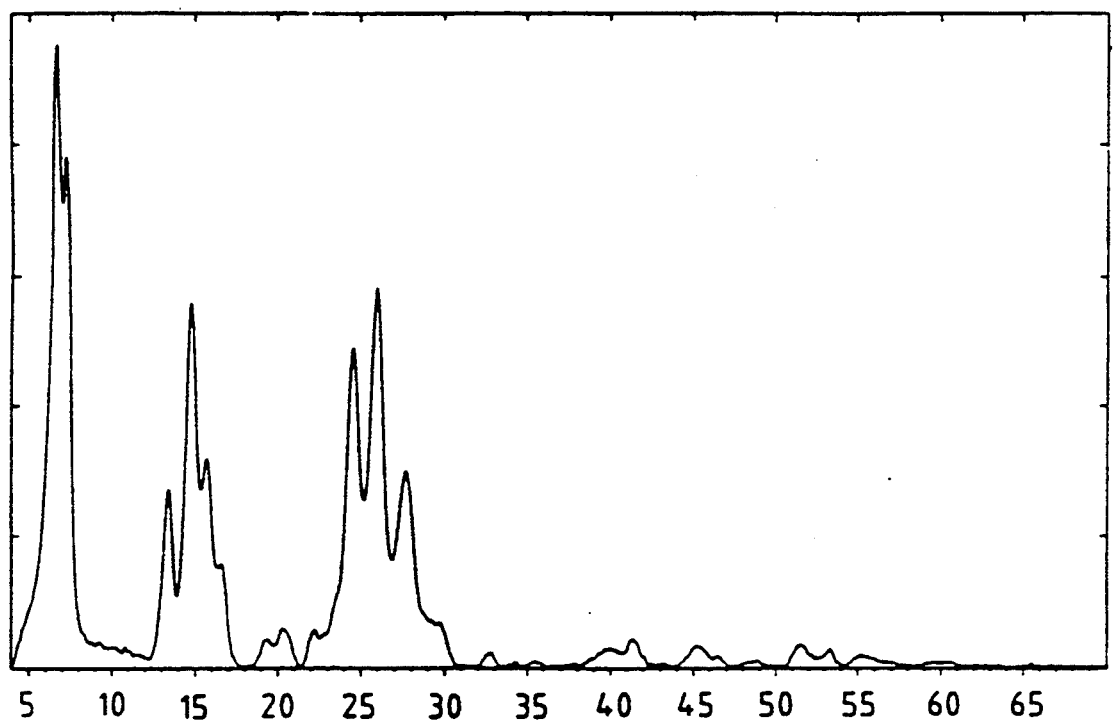

The products of Examples 15 to 25 had an X-ray diffractogram as per FIG. 2 and reddish hues.

EXAMPLE 26

Example 22 was repeated. The product was admixed with 10% by weight of the additives mentioned in DE-C-25 16 054, resulting in a pigment that is stable in coatings.

Figure 1:
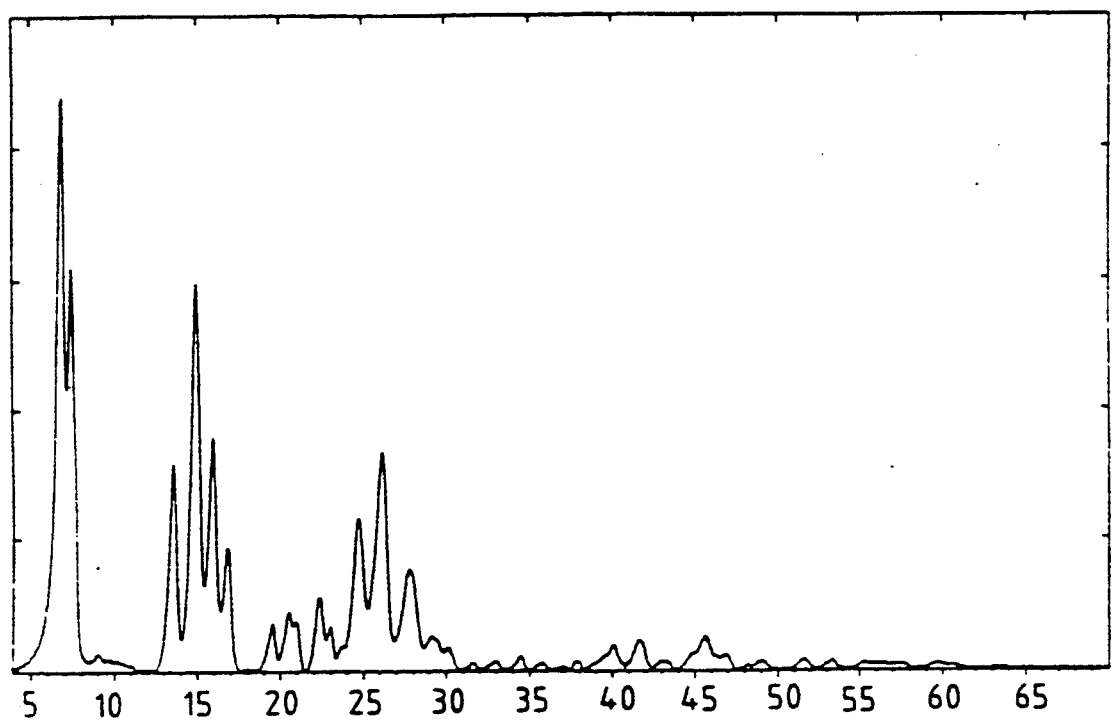
FIGS. 1-3 of the drawings show the glancing angles of an x-ray powder diagram of the metal-free phthalocyanines of the invention.

We claim:

1. A metal-free phthalocyanine of the γ-form, characterized by the X-ray powder diagram ($Cu_{X\alpha}$) having the essential glancing angles 2 θ 6.8, 7.4, 13.6, 14.9, 15.9, 16.9, 20.5, 22.4, 24.7, 26.2 and 27.8 (FIG. 1), optionally in mixture with other crystal forms of metal-free phthalocyanine in which case the glancing angles may be shifted by ±0.2 θ.

2. A metal-free phthalocyanine as claimed in claim 1 comprising from 35 to 100% of the γ-form.

3. A metal-free phthalocyanine as claimed in claim 1 comprising from 40 to 80% of the γ-form (FIG. 2).

4. A metal-free phthalocyanine as claimed in claim 1 comprising from 10 to 30% of the γ-form (FIG. 3).

* * * * *